United States Patent
Searle et al.

[15] 3,664,038
[45] May 23, 1972

[54] HUMAN SIMULATIONS (DUMMIES)

[72] Inventors: John Albert Searle, Market Bosworth; Dennis William Perrin, Fenny Drayton, both of England

[73] Assignee: Motor Industry Research Association, Lindley, near Nuneaton, Warwickshire, England

[22] Filed: Aug. 10, 1970

[21] Appl. No.: 62,501

[30] Foreign Application Priority Data

Aug. 8, 1969 Great Britain......................39,876/69

[52] U.S. Cl. ...............................................................35/17
[51] Int. Cl. .......................................................G09b 23/32
[58] Field of Search......................................................35/17

[56] References Cited

UNITED STATES PATENTS

| | | | |
|---|---|---|---|
| 2,483,034 | 9/1949 | Braeg | 35/17 |
| 3,557,471 | 1/1971 | Payne et al. | 35/17 |

*Primary Examiner*—Harland S. Skogquist
*Attorney*—Cushman, Darby & Cushman

[57] ABSTRACT

In a dummy simulating the human shoulder region, the shoulder joint is constrained to move in an arcuate path corresponding to the natural shoulder joint, by a guiderod secured to the spine region of the dummy. The rod is resilient and there is vertical play between the rod and the shoulder joint member. The latter may be pivotably connected to the sternum region.

8 Claims, 6 Drawing Figures

Patented May 23, 1972

INVENTOR
JOHN ALBERT SEARLE
DENNIS WILLIAM PERRIN

HUMAN SIMULATIONS (DUMMIES)

Human simulations, known as dummies, are in use in many situations, usually where it is too hazardous to use a living human subject, for example, in the testing of aircraft ejection seats, new designs of parachute, or automobile seat belts. It is important that the dummy should behave realistically.

Dummies are normally given a simulation shoulder joint having, within a specified range, movement in any direction. This may be achieved e.g. by using a ball and socket joint for the shoulder. However, the human shoulder joint can itself be moved (e.g., shrugging the shoulders), and existing methods of allowing for this are far from satisfactory.

In describing the background of this invention and the invention itself, reference will be made to the accompanying drawings in which.

Figure 1A:
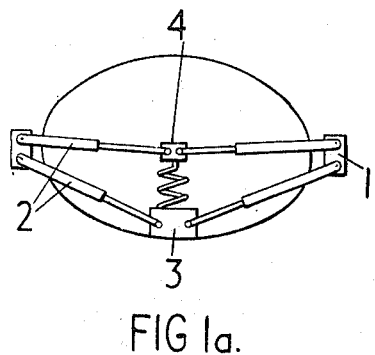
FIGS. 1a and 1b are plan views of known dummies.
Figure 1B:
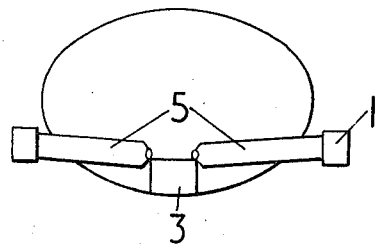

One existing shoulder simulation shown in plan in FIG. 1a, mounts the shoulder joint 1 at the outward end of a wishbone of which the branches are telescopically extensible rods 2 connected respectively to the spine 3 or a sprung front block 4. This is unsatisfactory because, among other reasons, it allows the shoulder joint to move laterally outwards, which is impossible in the human body. Another existing method (FIG. 1b) has the shoulder joint 1 mounted on a single beam 5 which is freely pivoted at its inboard junction to the spine 3.

Figure 2A:
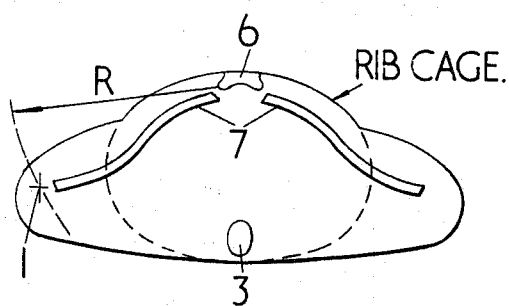
FIGS. 2a and 2b are plan and side views of the human shoulder region.
Figure 2B:
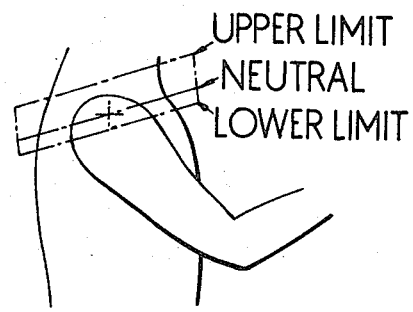

Neither of these arrangements allows for the essential characteristics of the human shoulder (see FIG. 2a and 2b), which are:

1. The distance between the sterno-clavicular joint, at the top of the sternum 6, and the shoulder joint 1 does not vary as the shoulder is moved, being fixed by the length of the clavicle 7. (see FIG. 2a).
2. Loading the clavicle depresses the shoulder joint.
3. Load applied to the shoulder is transferred, via the scapula, to the second to seventh ribs.
4. When the shoulder is brought forward, it tends to rise. (See FIG. 2b).
5. For any fore-and-aft position of the shoulder, there is approximately the same amount of vertical movement possible.
6. The two shoulders are independent.

According to the present invention, there is provided a simulation of the human shoulder region, comprising a shoulder joint member, means simulating the upper human torso, and means guiding the shoulder joint member in an arc about a position which corresponds to the human sternum. The guiding means is preferably a curved guide rod.

The guiding means has no counterpart in the human body except insofar as the motion of the scapula is constrained by neighboring muscles.

Figure 3:
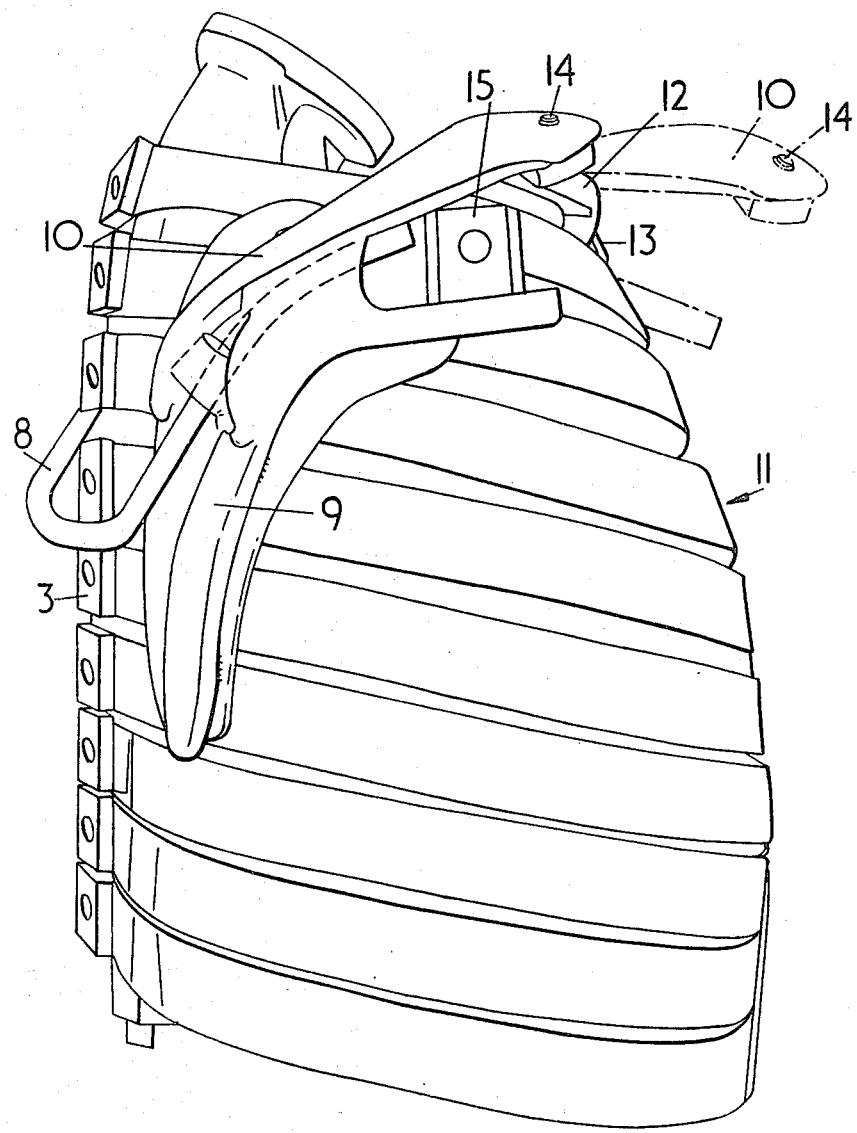
FIG. 3 is a side view of an embodiment of the invention.

In a preferred arrangement, which allows all the abovementioned shoulder joint characteristics to be reproduced, members representing the human clavicle and scapula, with the addition of a guide-rod for the scapula, are provided. This guide-rod has, as already mentioned, no counterpart in the human skeleton, but simulates the effect of a large number of muscles in the vicinity of the human scapula which constrain it to move within limits. Vertical play is provided to simulate the vertical movability of the human shoulder, embodiment of the invention is shown in FIG. 3, side view. A guide rod 8 is fixed to the spine 3, and sweeps upwards and forwards to pass over the blade of a member 9 corresponding to the human scapula but underneath the similated scapular ridge 10. The rod 8 extends, from the spine, sideways, upwards and forwards. The rod is of metal, e.g. one-fourth inch diameter, and the space in member 9 through which it passes is e.g. 1½ inch × ⅜ inch, so that about 1¼ inch of free vertical movement of the scapula member 9 is possible. Upward movement outside this range is restrained by the resilience of the guide-rod, and downward movement outside this range causes the load to be shared between the guide-rod and the simulated rib-cage 11. A stop on the guide-rod (not shown) provides the limit for forward movement (indicated in broken lines in FIG. 3). The shoulder joint 15 is a pin joint on the scapula member 9.

Figure 4:
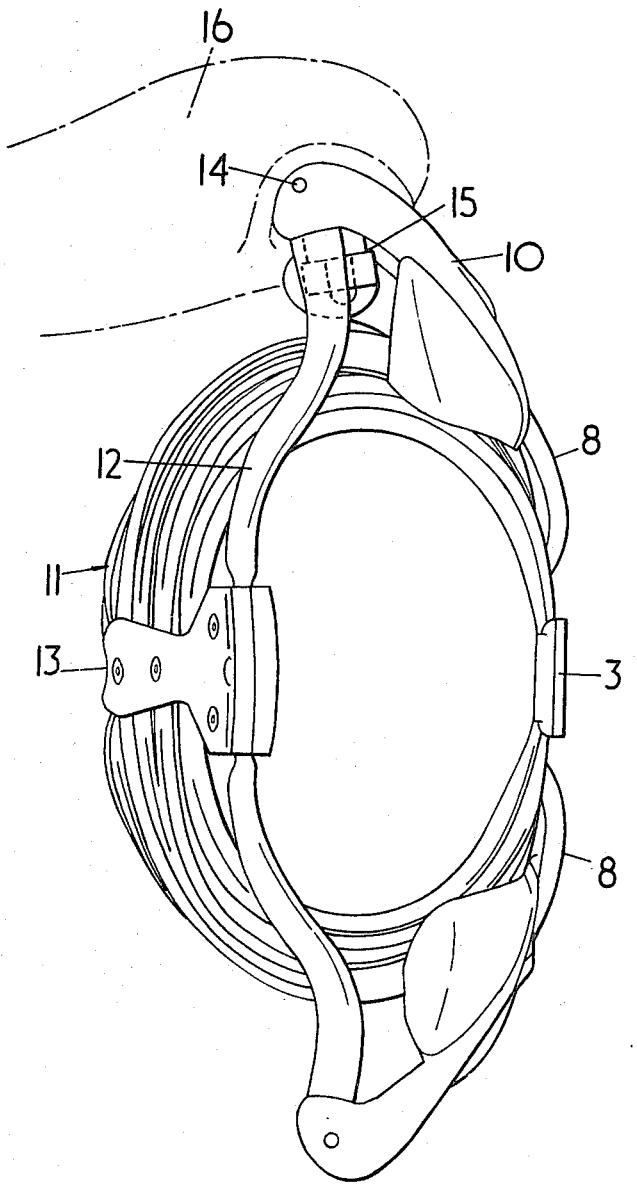
FIG. 4 is a plan view of said embodiment.

In the arrangement shown in FIGS. 3 and 4, the member 12 simulating the clavicle has the shape of a human clavicle and has a ball joint (not shown) at its connection to the sternum 13. The scapula member 9 also has the shape of a human scapula and is pin jointed to the clavicle at 14. Members 16 representing the arm (shown dotted) will be jointed to the pin joint 15. The invention is not limited to such exact reproduction of the human body so has been described but consists more generally in controlling the movement of the shoulder joint by having it follow a guide-rod or rods or other guide means, regardless of the accuracy of the reproduction of the human skeleton. Optional refinements are having a loose fit to permit a range of free vertical movement of the shoulder joint, making the guide-rod springy to simulate the way in which force can extend the usual limits of movement, having the shoulder movement also guided by a clavicle linking it to the sternum, and having a stop on the guide-rod to limit forward movement, as described above.

The invention provides a neat and practicable solution to a problem which has given trouble to leading test-dummy manufactures. The result of the invention is a considerable increase in the realism of the shoulder region — this feature being especially important in dummies intended for seat belt testing.

We claim:

1. A simulation of the human shoulder region, comprising a shoulder joint member, means simulating the upper human torso, and means guiding the shoulder joint member in an arc about a position which corresponds to the human sternum.
2. A simulation as claimed in claim 1 wherein the guiding means permits vertical movement of the shoulder joint member.
3. A simulation as claimed in claim 1 wherein the guiding means is a guide rod of curved shape.
4. A simulation as claimed in claim 3 wherein the guide rod is secured to means simulating the spine and therefrom extends sideways, upwards and forwards, the shoulder joint member being slidable with respect to the rod.
5. A simulation as claimed in claim 4 wherein the shoulder joint member is part of a member simulating the human scapula and traversed by the rod.
6. A simulation as claimed in claim 4 wherein there is vertical play between the shoulder joint member and the rod.
7. A simulation as claimed in claim 3, in which the rod is resilient.
8. A simulation as claimed in claim 1 further comprising a member simulating the human clavicle which member is coupled to the shoulder joint member and is pivoted to the means simulating the torso at a position which corresponds to the sternum.

* * * * *